United States Patent [19]

Parry

[11] Patent Number: 5,013,595
[45] Date of Patent: May 7, 1991

[54] STRETCH FILM WITH AUXILIARY BAND

[75] Inventor: John C. Parry, Baltimore, Md.

[73] Assignee: J. C. Parry & Sons Co., Inc., Baltimore, Md.

[21] Appl. No.: 125,574

[22] Filed: Nov. 25, 1987

[51] Int. Cl.⁵ .......................... B32B 3/14; B65D 5/28
[52] U.S. Cl. ...................................... 428/77; 428/200; 428/207; 428/215; 428/910; 428/906; 428/516; 229/3.5 R; 156/191
[58] Field of Search ............... 428/516, 215, 157, 200, 428/207, 77, 78, 79, 910

[56] References Cited

U.S. PATENT DOCUMENTS

| | | | |
|---|---|---|---|
| 3,506,528 | 4/1970 | Dean | 428/78 |
| 3,611,492 | 10/1971 | Scheibling | 264/172 X |
| 3,686,060 | 8/1972 | Gurtler | 428/78 |
| 3,986,611 | 10/1976 | Dreher | |
| 4,101,355 | 7/1978 | Ausnit | 156/66 |
| 4,302,920 | 12/1981 | Lancaster et al. | |
| 4,379,197 | 4/1983 | Cipriani et al. | 428/516 X |
| 4,386,124 | 5/1983 | Akao | 428/35 |
| 4,499,706 | 2/1985 | Scheller | |
| 4,518,654 | 5/1985 | Eichbauer et al. | |
| 4,548,024 | 10/1985 | Fine | |
| 4,662,148 | 5/1987 | Nilsson | |
| 4,691,497 | 9/1987 | Lancaster | |
| 4,872,623 | 10/1989 | Parry | 242/96 |

FOREIGN PATENT DOCUMENTS 196949 11/1982 New Zealand .

*Primary Examiner*—P. C. Sluby
*Attorney, Agent, or Firm*—Shoemaker and Mattare, Ltd.

[57] ABSTRACT

Stretch wrapping film is reinforced by means of an auxiliary band that is laminated to the stretch film, thereby obtaining improved effective film strength without requiring the use of heavy duty films. Propagating tears that do occur are arrested by the band. The band may be rendered visually distinctive by coloration or imprinting, to identify the load with which it is wrapped, and to enable one to locate the leading edge of the film on the roll.

9 Claims, No Drawings

STRETCH FILM WITH AUXILIARY BAND

BACKGROUND OF THE INVENTION

This invention relates to a material for wrapping a pallet or like object, particularly to a stretch film laminated with a relatively narrow auxiliary band. The invention further applies to a method of stretch film wrapping.

Various stretch films are available today for wrapping diverse packages and other goods. One important use of stretch films is to wrap pallets of stacked boxes or the like. In such processes, a pallet of containers is wrapped with several turns of a stretch film of substantial width and many various techniques for doing so are known. The stretch film used is capable of substantial elongation, and by maintaining the film under adequate tension as it is passed around a pallet, not only does the film conform to corners and other irregularities, but it also remains under tension to tightly retain the containers against one another and upon the pallet. Sharp corners and the like can, however, tear the film, and to avoid this one must be judicious in applying tension to the film particularly when negotiating such corners. Stretch films are generally transparent and nondescript. They are difficult or impossible to print upon; when printing can be done, the printing process may approximately double the cost of the film.

U.S. Pat. No. 4,499,706 to Scheller indicates an awareness of the problem of film tearing at corners and provides, to resist such tears, a tube of film that is tucked in at its edges to provide extra layers of film at the points most likely to encounter container corners.

To avoid tears, one can use film of greater thickness, but this necessarily increases costs and the amount of tension needed to produce a desirable degree of elongation.

We have found that one can obtain the advantages of a heavy gauge or laminated film by providing a film of standard thickness with an additional, much narrower, band of film to improve tear and puncture resistance. The relatively narrow band may be of the same type of material as the film and the same thickness, or it can be of different gauge or different material. Additionally, the narrow band may have visual characteristics such as color or printed indicia for identifying the goods, or the shipper, or for other purposes. The economic advantages of the invention are particularly significant when the band is imprinted, because one may imprint a single roll of material and sever it into many narrow bands each suitable for laminating with a standard unprinted film.

DESCRIPTION OF THE PREFERRED EMBODIMENT

According to the invention, stretch film of the given gauge and thickness is laminated with a band of film of substantially smaller width, to produce a laminate, that can subsequently be used for wrapping pallets and the like. "Laminating", as used herein, means placing one layer against another in such a way that some adherence between layers results. The films may have sufficient natural cling that no adhesive or the like is necessary. However, we presently prefer to treat at least one side of the band material by coating it with a thin film of a colorless, odorless liquid having a specific gravity of from 0.871 to 0.887 isobutylene, which produces a strong clinging effect, as measured by ASTM test D-1298 at 15.5° Centigrade, when the layers are placed together. Other tacky substances or adhesives may be used, and we refer to these collectively as "adherents" in the claims below.

The band is preferably traversed across the width of the substrate as it is applied so that when reeled, the band thickness is distributed uniformly over the width of the reel and does not produce areas of greater diameter as would occur if the band were not traversed.

The invention may be practiced with numerous combinations of substrate and banding material, whose choice will be dependent upon the contemplated end use for the product. The following examples set forth presently preferred embodiments of the invention.

EXAMPLE I

A wooden pallet was stacked with cardboard shipping cartons to a height of four feet. The pallet and cartons were wrapped with four layers of 60-gauge stretch film of linear low density polyethylene. During application, the film was maintained under tension sufficient to produce 100% elongation. To simulate a tear of the type that can occur during handling, the wrapping was cut through with a small knife, near its lower edge. Beginning at the cut, a tear rapidly propagated across the width of the wrapping, destroying its integrity.

EXAMPLE II

The film wrapping was removed from the pallet and carton assembly of Example I. Film identical to that in Example I, laminated to a two-inch wide reinforcing band of 80-gauge film of polyethylene, was wrapped around the pallet and carton assembly as in Example I. Tension was maintained sufficient to produce the same degree of elongation as in Example I. When the film was cut, tears propagated across its width only as far as the reinforcing band, thus illustrating its effectiveness.

EXAMPLE III

A thirty-inch wide roll of bright red 100-gauge polyethylene film was severed into thirty rolls, each one inch wide. Material from each of the resulting narrow rolls was rewound into a twenty-inch roll of transparent 60-gauge polyethylene film. When subjected to the tear resistance test of Example I, results similar to those in Example II were noted. Furthermore, the band, clearly visible through the transparent film, readily distinguished the pallet load from others.

EXAMPLE IV

A thirty-inch wide roll of 100-gauge polyethylene film whose surface was specially treated to receive printing was imprinted with 15 identical columns of bold Helvetica lettering identifying a shipper. The direction of the printing was periodically reversed, to make the orientation thereof unimportant in use. This roll was then severed into fifteen two-inch wide rolls, each of which was laminated to a twenty-inch wide roll of stretch film identified in Example I.

The printing was readily detectable in the finished product from a distance, even though the film had been stretched 100%, i.e., to twice its original length.

EXAMPLE V

A roll of 100-gauge polyethylene film was imprinted with an array of rectangles. Each rectangle had a width, across the width of the film, approximately twice that of its length. The roll was cut into narrow rolls as in the previous example, and rewound into a roll of polyethylene stretch film of the type used in Example I. The laminate was then used to stretch-wrap a pallet load as before. When stretched, the rectangles on the band grew lengthwise and shrank widthwise. This deformation enabled the person applying the film accurately to estimate the amount of film elongation.

In Examples III, IV and V, the visual distinctiveness of the narrow band readily enabled the worker to locate the end of the stretch film on the reel at the beginning of the wrapping process.

The foregoing examples by no means are exhaustive of the applicability of the invention. Any of other various wrapping materials, including polypropylene, polyvinylchoride, and polyurethane may be used for the auxiliary bands, and likewise, materials other than polyethylene may be used for the substrate. In the examples, previously wound films were rewound together; however, one or both of the bands could be laminated to the other right out of a film extruder.

Inasmuch as the invention is subject to various modifications and changes in detail, it is intended that the foregoing shall be interpreted as illustrative of the invention, whose scope is to be measured by the following claims.

I claim:

1. A stretch wrapping laminate for wrapping pallets of stacked boxes and the like comprising a primary, substantially transparent, stretch film layer of a predetermined gauge and lateral width laminated with at least one auxiliary band of a stretchable film material visually different from that of said primary layer and of substantially lesser lateral width than said primary layer, for reinforcing the film and rendering it visually distinctive.

2. The invention of claim 1, wherein said band material has a thickness different than that of said primary film.

3. The invention of claim 1, wherein at least a portion of said band is opaque.

4. The invention of claim 3, wherein said band is colored.

5. The invention of claim 3, wherein said band is imprinted.

6. The invention of claim 5, wherein said band is imprinted with identifying characters.

7. The invention of claim 5, wherein said band is imprinted with spaced geometric figures, whose deformation can be observed during stretching of the band to estimate its degree of elongation.

8. The invention of claim 7 wherein the geometric figures are rectangles.

9. The invention of claim 1 further comprising an adherent substance for causing said bands to promote adhesion to said primary film.

* * * * *